June 18, 1935.  R. F. PEO  2,004,960
SHOCK ABSORBER
Original Filed Aug. 12, 1931   2 Sheets-Sheet 1
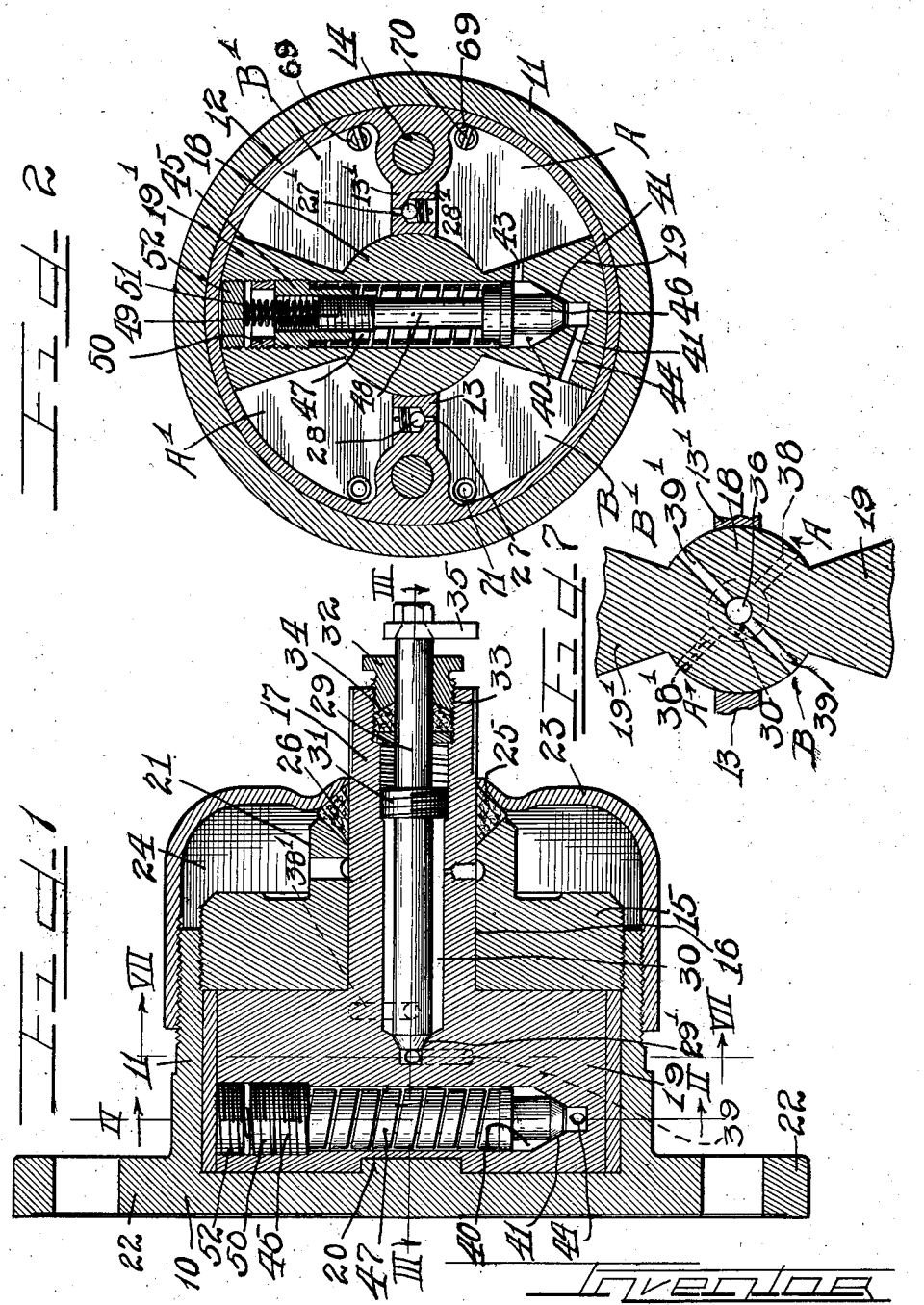
Inventor
Ralph F. Peo.

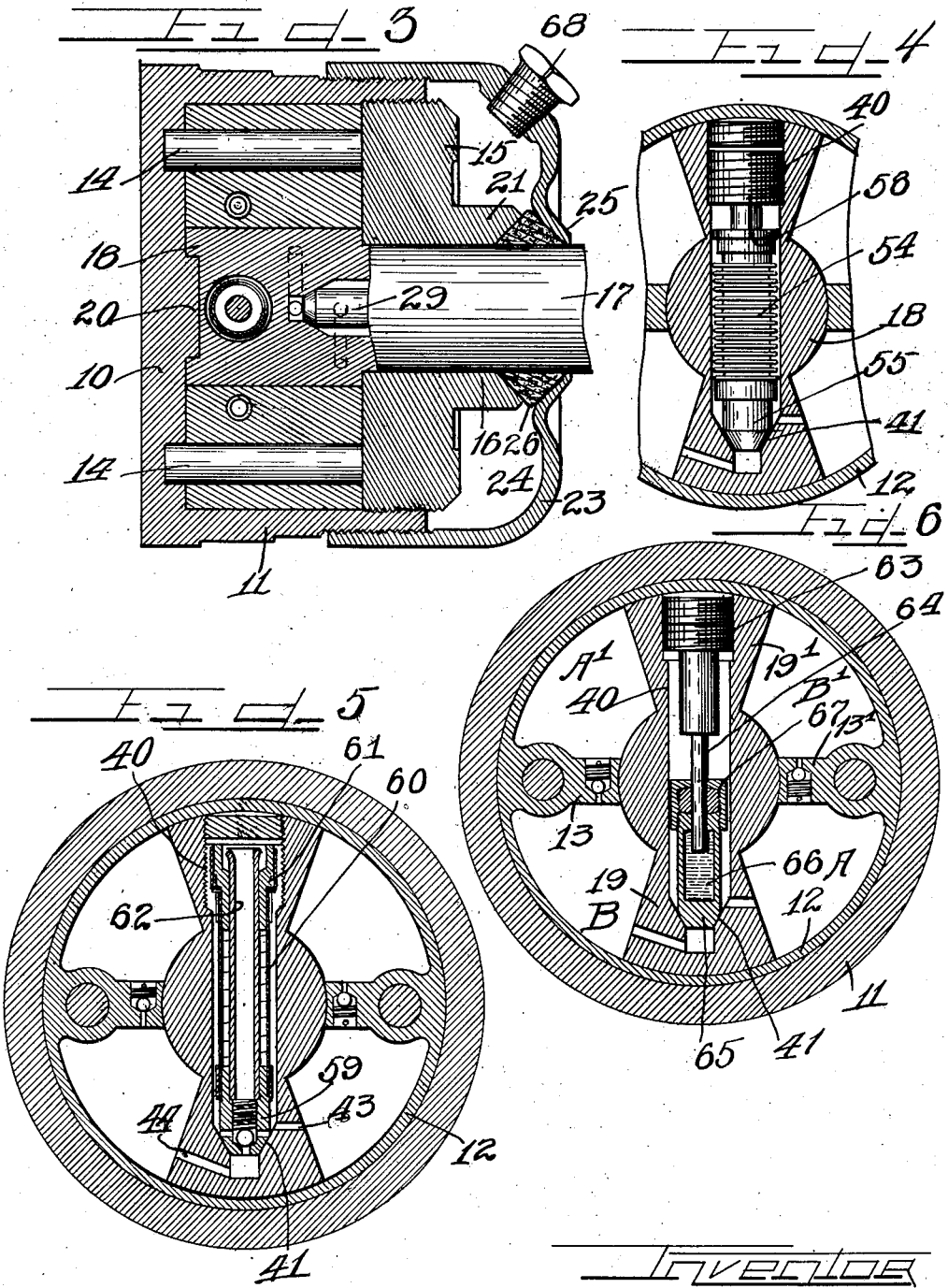

Patented June 18, 1935

2,004,960

UNITED STATES PATENT OFFICE 2,004,960

SHOCK ABSORBER

Ralph F. Peo, Buffalo, N. Y., assignor to Houde Engineering Corporation, Buffalo, N. Y., a corporation of New York Application August 12, 1931, Serial No. 556,483
Renewed June 7, 1934

5 Claims. (Cl. 188—89)

This invention relates to hydraulic shock absorbers particularly adaptable for use on vehicles and in which a resistance liquid is employed whose viscosity changes materially with temperature variations.

An important object of the invention is to produce a shock absorber structure in which valve means are provided which are readily adjustable from the exterior of the device for controlling the resistance to flow of the fluid from the high pressure side to the low pressure side of a moving piston structure, together with thermostatically controlled means entirely within the structure and inaccessible from the exterior for modifying the flow of liquid from the high pressure side to the low pressure side in accordance with temperature changes of the liquid so that at all times and under all temperature conditions the liquid will flow so as to maintain the desired riding qualities and characteristics for which adjustment has been made by the manually adjustable valve means.

A further object of the invention is to provide valve means manually adjustable from the exterior of the shock absorber to control certain relief passageways from the high pressure to the low pressure side of a piston structure, and a thermostatically operated valve structure contained entirely within the piston element for controlling other relief passageways from the high pressure to the low pressure sides of the piston structure and in proportion to the change of viscosity of the liquid in response to temperature variations so that the thermostatically controlled relief passageways will cooperate with the passageways fixed by an adjustment of the manually adjustable valve means for the interflow of fluid from one side to the other of the piston structure to maintain the desired riding characteristics of the shock absorber and to prevent material variations in such characteristics as the temperature changes.

A further object of the invention is to provide in a rotary type of hydraulic shock absorber, a valve pocket extending diametrically into the piston structure from one circumferential side thereof and terminating in a valve seat, so that a thermostat valve unit of desired design may be readily inserted into the pocket and suitably adjusted before assembly of the piston structure within the cylinder element, with the piston structure provided with relief passageways to be controlled by the cooperation of the thermostat valve with the valve seat under temperature changes to modify the flow of liquid from the high pressure to low pressure sides of the piston structure when assembled in the cylinder element.

The above referred to and other features of the invention are incorporated in the structures disclosed on the accompanying drawings, in which drawings Figure 1 is a diametral section through a rotary shock absorber showing my improved valve arrangement;

Figure 2 is a section on plane II—II of Figure 1;

Figure 3 is a section on plane III—III of Figure 1;

Figures 4, 5, and 6 are sections similar to that shown in Figure 2 but disclosing different forms of thermostat valve structures; and Figure 7 is a sectional view on plane VII—VII of Figure 1.

The shock absorber shown comprises a base 10 having the cylindrical annular flange 11 extending therefrom within which and in engagement therewith is the ring 12 supporting diametrically opposite radially inwardly extending walls 13 and 13', which walls may be cast integral with the ring and the entire structure is rigidly secured by means of pins 14 engaging in the base 10.

At its outer end the flange 11 has internal threading for receiving a head 15 which engages against the outer end of the ring structure 12 and its walls 13 and 13'. The head 15 has the axial bore 16 for receiving the shaft 17 which at its inner end has the hub 18 extending through the ring 12 between the inner ends of the walls 13 and 13' and the hub has the diametrically opposite plungers or wings 19 and 19' extending therefrom. The head 15 engages the outer ends of the hub and the plunger wings, the inner ends of the wings engaging the base 10 and the hub being recessed at its inner end to receive a guide boss 20 on the base 10. The walls 13 and 13' form partitions between which and the plunger wings are the spaces for containing a suitable resistance fluid such as glycerine, oil, or other fluids.

The head 15 has the boss 21 thereon for increasing the bearing surface for the shaft 17, and in practice, as is well understood in the art, the outer end of the shaft has a lever extending therefrom adapted for connection usually with the axle of a vehicle, while the base 10 has the lateral ears or lugs 22 by means of which it may be secured, usually to the vehicle chassis. A cap 23 has an opening for receiving the shaft 17 and has threaded engagement with the outer end of the flange 11 and forms a fluid replenishing chamber 24. The section 25 of the cap surrounding the shaft 17 is deflected outwardly and the outer end of the boss 21 is undercut so that an annular chamber of triangular cross section is formed for receiving suitable packing material 26 for preventing leakage of fluid to the exterior along the shaft.

During travel of the vehicle and relative movement between its axle and chassis, the shaft 17 will be oscillated and the plunger wings 19 and 19' move back and forth to displace the fluid within the fluid spaces A, A' and B, B' between the plunger wings and the partition walls 13 and 13'. The spaces B, B' constitute low pressure chambers from which the fluid may flow to the spaces A, A' which constitute high pressure chambers, through ports 27, 27' in the partition walls 13, 13', but flow from the high pressure to the low pressure chambers is prevented by check valves 28 and 28'. The connection of the shock absorber with a vehicle is usually such that during movement of the vehicle body and axle toward each other the plungers or pistons will move toward the low pressure chambers from which the fluid may flow with comparative freedom to the high pressure chambers past the check valves, but movement of the body and axle away from each other is resisted. To relieve this resistance to any desired degree relief passageways of by-passes are provided between the high pressure chambers and the low pressure chambers. In accordance with my invention I provide relief passageways adjustable manually from the exterior of the shock absorber structure for the desired riding qualities of characteristics of the lief passageways automatically controlled by shock absorbers, and in addition I provide re-thermostatic means in accordance with the temperature of the fluid so that changes in the viscosity of the resistance fluid will be automatically compensated for in order to maintain the riding conditions and characteristics of the shock absorbers for which setting was made by the manual adjustment means.

The manually adjusting means may, as shown, comprise a valve stem 29 extending through the bore 30 in the shaft 17, the stem having a threaded hub 31 engaging the internal threading of the bore so that by turning the stem it may be adjusted longitudinally. At its outer end the stem is journalled in a plug or gland 32 threading into the pocket 33 in the end of the shaft and compressing packing material 34 so as to prevent leakage, the outer end of the stem having a lever 35 connected thereto by means of which the valve stem may readily be turned for adjustment thereof.

The inner end 36 of the bore 30 is of reduced diameter and between this end and the main bore 30 is the conical valve seat for the conical end 29' of the valve stem.

At its inner end the main bore 30 is connected by ports 38, 38' with the high compression chambers A and A', these ports extending radially through the hub 18 and terminating adjacent to the respective plungers or piston wings 19 and 19'. The inner reduced end of the bore 36 is connected by ports or passageways 39, 39' with the low compression chambers B and B', these passageways extending radially through the hub and terminating adjacent to the plungers or piston wings, as clearly shown in Figure 7. The high pressure chambers are thus always connected together through the ports 38, 38' and the main bore 30 and the low compression chambers are always connected together through the ports 39, 39' and the inner end 36 of the bore, and the degree of communication between the high pressure chambers and the low pressure chambers is determined by the setting of the valve 29. When the valve is open and the shock absorber is operating on its pressure stroke, fluid may flow from the high pressure chambers to the low pressure chambers past the valve end 29', but the check valves 28 and 28' will remain closed. During reverse stroke of the shock absorber the fluid may flow from the low pressure chambers to the high pressure chambers past the valve and fluid may also flow through the check valves. The adjustment of the valve 29 determines the relief flow of the fluid for the desired riding characteristics or conditions of the shock absorber and adjustment can readily be made by distributors or owners of cars.

During temperature changes, particularly seasonable temperature changes, the viscosity of the resistance fluid will change. During lower temperatures or colder weather the fluid becomes more viscous and during hotter temperature or summer weather the viscosity greatly decreases and unless compensation were made for such change in viscosity the shock absorber would not maintain its riding qualities and characteristics for which setting was made by adjustment of the manual adjustable valve mechanism. I therefore provide valve mechanism controlled thermostatically to automatically adjust compensating relief passageways or bypasses between the high compression and low compression chambers and I preferably place the thermostatic means within the shock absorber so as to conceal it against tampering. In the arrangement of Figures 1 to 3, the thermostat valve means employed may be that disclosed in my copending application Serial No. 514,094, filed February 7th, 1931. I preferably insert the valve structure in a bore or cylindrical pocket 40 extending diametrally through the piston structure from the end of one of the piston wings and with its inner end forming a valve seat 41. In the arrangement shown the bore 40 extends from the end of the piston wing 19' and the seat 41 is in the piston wing 19 and a port 43 extends through the wing 19 to the high compression chamber A from the bore inside of the valve seat while the port 44 extends to the low compression chamber B from the bore outside of the valve seat.

Briefly, the valve structure shown comprises a head 45 which is threaded to engage the internal threading along the outer end of the bore 40, and the valve end 46 for cooperating with the seat 41. The helical thermostat coil 47 is secured at its end to the head 45 and to the valve point 46 and as the head 45 is fixed, the helical expansion and contraction of the thermostat coil will rotate the valve point. The valve point has the stem 48 extending therefrom through the thermostat coil with its upper end 49 having comparatively loose threading engagement with the threaded bore of the head 45 so that when the valve point is turned by the thermostat coil the threaded engagement of its end in the head 45 will cause axial movement of the valve point relative to the valve seat so that the position of the valve point relative to the valve seat will determine the degree of relief flow from the high pressure to the low pressure chambers A and B through the ports 43 and 44. An annular lock nut 50 rigidly holds the valve head 45 in adjusted position and a compression spring 51 interposed between the end of the valve stem and a plug 52 threaded in the end of the bore 40, will yieldingly hold the valve stem and valve in position to which it has been adjusted by the thermostat coil.

The thermostat valve structure is inserted in the piston structure before assembly of the shock absorber parts and the piston structure is then maintained at some definite temperature which should be higher than that which would be normally encountered by the shock absorber in service. For example if adjustment is made for seasonal change the piston structure will be maintained at some definite temperature which would be higher than that normally encountered in summer traveling. It might be maintained at the temperature of say 130, 140 or 150°, and while the piston structure is at such temperature the thermostat valve is set to full closed position. Then when the assembly of the shock absorber is completed and the structure has cooled, the thermostat valve would be partially open. Manual adjustment is then made of the valve 29 for the desired riding characteristics of the shock absorbers by the installer of the shock absorbers and this manual adjustment could be later changed as desired. The thermostat valve mechanism is however inaccessible but functions automatically to control the bypass ports 43 and 44 to assist the by-pass ports controlled by the valve 29 in providing for and maintaining the proper interflow of fluid between the high pressure and the low pressure chambers during temperature changes so that the response of the shock absorbers will not vary with temperature changes but will always deliver the shock absorbing characteristics for which setting was made by the adjustment of the manual valve. In other words after setting has been made by the manual adjustable valve mechanism for certain desired riding qualities and conditions, the thermostatically operating valve means assures maintenance of such riding conditions independently of temperature changes.

In the structure shown the high pressure chamber A is always in communication with the high pressure chamber A' through ports 38 and 38' and the low pressure chamber B is always in communication with the low pressure chamber B' through the ports 39 and 39', and therefore it will be necessary only to connect one high compression chamber with one low compression chamber as for example the chambers A and B for interflow of fluid through the relief ports 43 and 44.

In Figure 4 I show a bellows type thermostatic valve structure in which the expansion and contraction of a suitable fluid within a bellows 54 controls the axial movement of the valve point 55 secured to the lower end of the bellows, the upper end of the bellows being connected with a head 58 threading into the bore 40 through the piston structure.

In the thermostat valve structure of Figure 5, the valve point 59 is secured to the lower end of the thermostat coil 60 which at its upper end is secured to the head 61 having threaded engagement in the bore 40, the adjacent turns of the thermostat coil being in abutting engagement so that helical expansion and contraction will cause turning of the valve point and axial movement thereof to cooperate with the valve seat 41, a stem 62 extending from the valve point through the coil and being slidable in the head 61 for guiding the movement of the valve point.

The valve structure of Figure 6 comprises a head 63 secured in the outer end of the bore 40, a stem 64 extending from the head and receiving the hollow valve point 65 which is filled with some temperature responsive means 66, as for example mercury, the valve point being slidable on the stem 64 so that as the mercury expands and contracts the point will be shifted axially along the stem to cooperate with the valve seat 41. Suitable packing 67 is provided around the stem so as to prevent leakage of the fluid from the valve point.

By placing the thermostat valve diametrally within the piston structure it is substantially surrounded by the fluid of the shock absorber to quickly partake of the temperature thereof so as to respond rapidly for control of the relief passageways. The valve bore or pocket is also open to the flow thereinto of the fluid and quick and accurate response of the valve structure is assured.

Fluid is automatically supplied to the working chambers as required from the replenishing chamber 24 which is adapted to be filled as required through an opening in its top which is normally closed by a plug 68. Delivery of the fluid from this replenishing chamber into the working chambers may be effected by means of one or more replenishing ports 69 connecting the lower end of the replenishing chamber with the lower fluid chambers in which the piston structure operates, and each of these ports contains a check valve 70 which opens toward the respective working chambers. Any air contained in the fluid is permitted to escape from the upper ends of the working chambers into the upper part of the replenishing chamber through vents 71 through the upper part of the head 15.

I thus produce a shock absorber of the hydraulic type in which manual adjustment is readily made for desired riding characteristics and in which a thermostatic valve will compensate for viscosity changes so that it will be unnecessary to repeatedly adjust the manual valve means. As the fluid in the shock absorbers heats up due to repeated compression thereof during operation of a vehicle, and the fluid becomes thinner, the thermostat valve will correspondingly reduce the size of the auxiliary relief passageways to correspondingly curb the interflow of fluid between the chambers. The same thermostatic compensation would be in effect for large variations in temperature, due to seasonal changes.

Although I have shown and described preferred embodiments of my invention I do not desire to be limited thereto as changes and modifications may be made without departing from the scope of the invention as defined by the appended claims.

I claim as follows:

1. In a shock absorber, the combination of a cylinder frame having partition extensions extending radially from opposite sides thereof, a piston structure comprising a hub centered between the inner ends of said partitions and having piston wings extending therefrom in diametrically opposite directions and bearing at their ends against the cylinder wall, said piston structure having a bore extending radially through one of said wings from the outer end thereof and diametrically through said hub and a distance into said other wing, a valve seat formed at the inner end of said bore, there being ports connecting said cylinder space at opposite sides of said piston wing with said bore at opposite sides of said seat, a valve in said bore for cooperating with said seat, and a thermostat element in said bore secured to said valve and adjustably anchored at its outer end in said bore, said cylinder wall closing the outer end of said bore against access to said valve from the exterior of the shock absorber.

2. A shock absorber comprising a cylindrical wall forming a fluid containing chamber, a piston rotatable in said chamber and comprising a hub and piston wings extending therefrom diametrically in opposite directions and engaging the wall of said cylinder at their outer ends, said piston having a valve pocket extending radially through one of said wings from the outer end thereof and diametrically through said hub and a distance into said other wing, there being a relief passageway through said piston wing and a valve seat interposed in said passageway, a valve in said pocket for cooperating with said seat, and a thermostat element within said pocket connected with said valve for operation thereof to control said relief passageway in accordance with temperature changes of the fluid.

3. A hydraulic shock absorber comprising a cylindrical wall forming a chamber for containing resistance fluid, a piston structure rotatable within said chamber and comprising a hub and piston wings extending in diametrically opposite directions therefrom and engaging the wall of said cylinder at their outer ends, a cylindrical valve pocket in said piston structure extending radially through one of said wings from the outer end thereof and diametrically through said hub and into said other wing, a relief passageway from one side of the piston structure to the other and intercepted by the inner end of said pocket, and a thermostat valve structure within said pocket for automatically controlling the flow of fluid through said relief passageway in accordance with temperature changes of said fluid.

4. In a hydraulic shock absorber comprising a cylindrical wall forming a chamber for containing resistance fluid, a piston structure rotatable within said chamber and comprising a hub and piston wings extending in diametrically opposite directions therefrom for displacing the fluid when the piston structure is oscillated, there being a bore in said piston structure extending radially through one of said wings from the outer end thereof and diametrically through said hub and into said other wing, said bore being connected by ports with said chamber at opposite sides of said piston structure, a head adjustable in the outer end of said bore, a valve at the inner end of said bore for cooperating with said ports to control the flow of fluid from one side of the piston structure to the other, and a stem structure between said head and valve for transmitting the adjustment movement of said head to said valve for adjustment of said valve relative to said ports.

5. In a hydraulic shock absorber comprising a cylindrical wall forming a chamber for containing resistance fluid, a piston structure rotatable within said chamber and comprising a hub and piston wings extending in diametrically opposite directions therefrom for displacing the fluid when the piston structure is oscillated, there being a bore in said piston structure extending radially through one of said wings from the outer end thereof and diametrically through said hub and into said other wing, said bore being connected by ports with said chamber at opposite sides of said piston structure, a head adjustable in the outer end of said bore, a valve at the inner end of said bore for cooperating with said ports to control the flow of fluid from one side of the piston structure to the other, and a stem structure between said head and valve for transmitting the adjustment movement of said head to said valve for adjustment of said valve relative to said ports, said stem structure being thermostatic whereby to automatically adjust said valve in accordance with temperature change.

RALPH F. PEO.